United States Patent
Aoe et al.

(10) Patent No.: US 7,057,982 B2
(45) Date of Patent: Jun. 6, 2006

(54) SERVO ERROR DETECTOR FOR OPTICAL DISK

(75) Inventors: Takashi Aoe, Kanagawa (JP); Hironobu Murata, Kanagawa (JP); Koyu Yamanoi, Chiba (JP)

(73) Assignee: Texas Instruments Incorporated, Dallas, TX (US)

( * ) Notice: Subject to any disclaimer, the term of this patent is extended or adjusted under 35 U.S.C. 154(b) by 338 days.

(21) Appl. No.: 10/340,092

(22) Filed: Jan. 10, 2003

(65) Prior Publication Data

US 2004/0013057 A1     Jan. 22, 2004

(30) Foreign Application Priority Data

Jan. 10, 2002    (JP)    .............................. 2002-003952

(51) Int. Cl.
    *G11B 7/00*     (2006.01)

(52) U.S. Cl. ................................. 369/44.34; 369/44.11
(58) Field of Classification Search ............ 369/44.34, 369/44.11, 44.35, 44.28
See application file for complete search history.

(56) References Cited

U.S. PATENT DOCUMENTS

| | | | | |
|---|---|---|---|---|
| 4,734,799 A | * | 3/1988 | Miyake | ........................ 386/45 |
| 4,998,234 A | * | 3/1991 | Rees et al. | ................ 369/44.27 |
| 5,408,452 A | * | 4/1995 | Sakemoto et al. | ........ 369/44.26 |
| 6,526,006 B1 | * | 2/2003 | Yoshimi et al. | ........... 369/44.28 |
| 2003/0007439 A1 | * | 1/2003 | Brunheim et al. | ........ 369/53.28 |

* cited by examiner

*Primary Examiner*—Hoa T. Nguyen
*Assistant Examiner*—Lixi Chow
(74) *Attorney, Agent, or Firm*—W. Daniel Swayze, Jr.; W. James Brady; Frederick J. Telecky, Jr.

(57) ABSTRACT

A servo error detector usable in an optical disk system is provided. An envelope detecting unit (24) detects the top envelopes and bottom envelopes of RF signals SA–SH, and top envelope signals SAtop–SHtop and bottom envelope signals SAbtm–SHbtm that represent the top envelope waveforms and bottom envelope waveforms of RF signals output from an optical detector. An analog/digital conversion unit (26) converts analog top envelope signals SAtop–SHtop and bottom envelope signals SAbtm–SHbtm corresponding to all input RF signals SA–SH to digital top envelope signals QAtop–QHtop and bottom envelope signals QAbtm–QHbtm, respectively. A digital operation unit (28) performs digital operation treatment for digital top envelope signals QAtop–QHtop and bottom envelope signals QAbtm–QHbtm to generate various servo error signals.

2 Claims, 9 Drawing Sheets

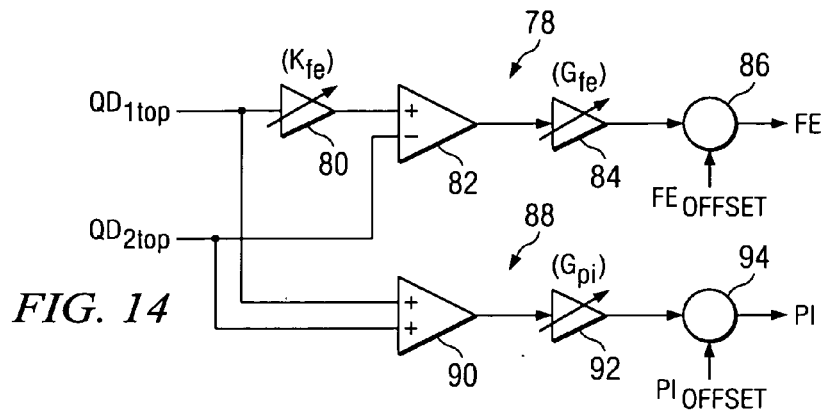
*FIG. 14*
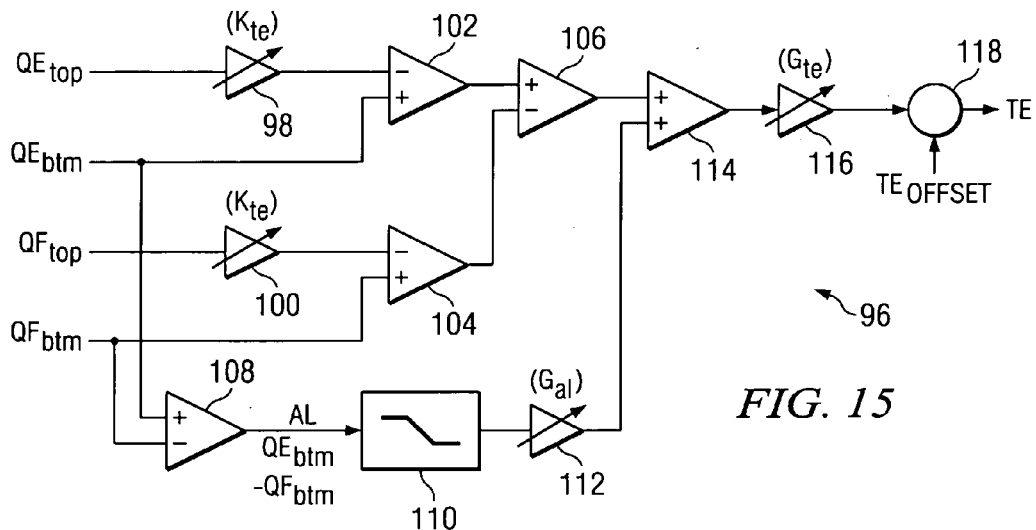
*FIG. 15*
*FIG. 16A* 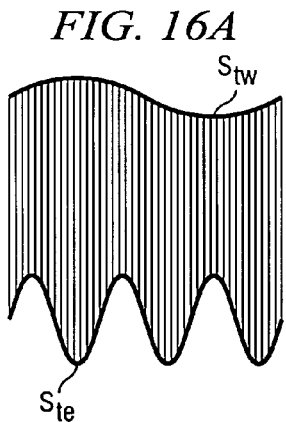 *FIG. 16B* 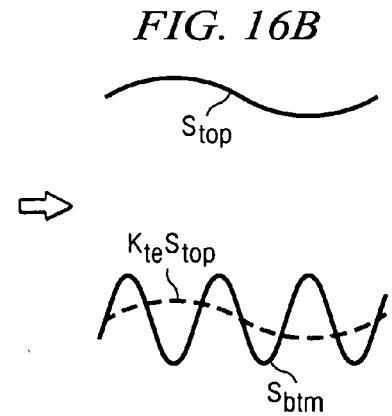 *FIG. 16C* 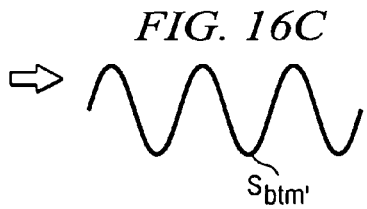

$f(t) = A_{RF} \cos\omega_{RF} t + A_{MOD} \cos\omega_{MOD} t$ $f(t) = A_{RF} \cos\omega_{RF} t \times (1 - A_{MOD} \cos\omega_{MOD} t) + A_{RF} - A_{MOD} \cos\omega_{MOD} t$

SERVO ERROR DETECTOR FOR OPTICAL DISK

FIELD OF THE INVENTION

This invention relates generally to a servo mechanism for an optical disk device; and, in particular, to servo error detector apparatus and methods for detecting position errors or optical errors of a light beam.

BACKGROUND OF THE INVENTION

This application relates to similar subject matter as U.S. Ser. No. 10/339,376 filed Jan. 9, 2003, entitled "Servo Error Detecting Device for Optical Disk," the entirety of which is incorporated herein by reference.

FIG. 1 (prior art) shows an example of the configuration of a conventional focus error detector in an optical disk device. This focus error detector utilizes operational amplifiers and comprises analog adders 200, 202, a subtractor 204, a coefficient multiplier 206, an offset adjustor 208 and an amplifier 210 connected as shown.

FIG. 2 shows light receiving regions A, B, C, D of an optical detector 212 of an optical pickup of an optical disk device for generating RF (radio frequency) signals based on light reflected off an optical disk and incident thereon. RF signals SA and SC obtained from light receiving regions A and C positioned along one of the diagonals are respectively input to the two input terminals of adder 200, and RF signals SB and SD obtained from light receiving regions B and D positioned along the other diagonal are respectively input to the two input terminals of adder 202. These RF signals SA, SB, SC, SD are typically voltage signals obtained by I-V conversion inside the optical pickup, with a reference voltage applied as a bias voltage on the pickup from the outside taken as a reference level.

Adder 200 takes the sum of the input signals SA and SC, and outputs a sum signal (SA+SC). The sum signal (SA+SC) is input to the positive side input terminal of subtractor 204. Adder 202 takes the sum of the input signals SB and SD, and outputs a sum signal (SB+SD). This sum signal (SB+SD) is multiplied by coefficient Gb by coefficient multiplier 206, and the obtained signal is input to the negative side input terminal of subtractor 204. Multiplier Gb serves to correct the balance of the comma aberration using an astigmatic aberration method.

Subtractor 204 takes the difference between the two input signals, and outputs a difference signal {(SA+SC)−Gb(SB+SD)}. This difference signal is a signal that represents the focusing error. Typically, for example, an offset portion Offset is cancelled at an offset adjustor 208, and the signal is Ga-fold amplified at an amplifier 210. Then, through an anti-aliasing filter or a low-pass filter (not shown in the figure), the signal is fed as a focus error signal FE to an A/D converter of the next stage (not shown in the figure).

The formula for performing the operation to generate focus error signal FE at the focus error detector can be represented by the following Equation (1):

$$FE=Ga\{(SA+SC)-Gb(SB+SD)-\text{Offset}\} \quad (1)$$

FIG. 3 (prior art) shows an example of the configuration of a conventional tracking error detector in a push-pull system. This tracking error detector utilizes operational amplifier circuits and comprises analog adders 214, 216, a subtractor 218, an amplifier 220, and an offset adjustor 222. Adder 214 takes the sum of RF signals SA and SD from left-side light-receiving regions A and D of the optical detector, and outputs it as a sum signal (SA+SD). Adder 216 takes the sum of RF signals SB and SC from right-side light-receiving regions B and C, and outputs it as a sum signal (SB+SC). Subtractor 218 takes the difference between the two signals and outputs a difference signal {(SA+SD)−(SB+SC)} which represents the tracking error. Usually, amplifier 220 amplifies with a Gc-fold gain; offset adjustor 222 cancels offset portion Offset; and the signal is fed through an anti-aliasing filter or low-pass filter (not shown in the figure) to an A/D converter (not shown in the figure) of the next stage as a tracking error signal TE.

The formula for performing the operation to generate tracking error signal TE at the tracking error detector can be represented by the following Equation (2):

$$TE=Gc\{(SA+SD)-(SB+SD)\}-\text{Offset} \quad (2)$$

As explained above, a conventional servo error detector is made of a combination of various analog circuits comprising operational amplifiers. In this case, one of the problems is that it lacks general applicability. In an optical disk device, the state and level of the output signal of the optical detector depend on the specifications of the optical pickup and optical disk. Consequently, it is necessary to amend the servo error detector and to change the gain and offset values corresponding to these specifications. For example, when offset adjustor 208 and amplifier 210 are swapped with each other (with respect to the front/rear relationship) in the focus error detector, while the difference in the operation formula relates to whether the offset value Offset is outside or within the parentheses, individual circuit configurations take place on the IC (integrated circuit) level.

Also, the astigmatic aberration method is an example of focus error detection. There are also three or four types of focus error detecting systems. As far as detection of the tracking error is concerned, the aforementioned push-pull system is merely an example, there are also other systems that may be used. Consequently, it is necessary to prepare a servo error detector for each system or each set of specifications.

Also, the circuit configuration becomes more complicated. This is also a problem. For example, for a device for reproduction of a RW (re-write phase-change type) optical disk, which has a reflectivity of about ¼ or lower that of a CD-ROM or other conventional stamped disk, the level of the RF signal output from the optical detector is rather low. Consequently, one has to significantly increase the gain of the servo error detector to compensate for this. At this point, in a conventional servo error detector, an offset canceling circuit of an operational amplifier has to be set for each section of the operation, and the circuit configuration becomes complicated with respect to its adjustment and setting. That is, the configuration cannot be made as simple as indicated by said operation equations (1) and (2).

In addition, there is also problem in the precision of the servo error signal. For an optical disk device, the precision of the servo depends on the precision of the servo error signal. For example, in a tracking servo, when the optical pickup jumps from the track being tracked to another track, if the precision of the tracking error signal is not high, a long time is required from application of the tracking servo near the target track to the track ON state, and it is hard to perform the tracking correctly.

FIGS. 4A and 4B are diagrams schematically illustrating the waveforms of RF signals SA, SB, SC, SD obtained using light receiving regions A, B, C, D of the optical detector in the case of track jumping. For the waveforms of the various RF signals, sinusoidal level variation Ste appears on the bottom. This is because the beam spot of the laser beam radiated from the optical pickup on the signal recording surface of the optical disk alternately traverses the track portion (pit) and the mirror portion between tracks (the flat portion without the pit). When the beam spot traverses the track portion, the intensity modulation or diffraction due to the pit becomes maximized (as a result, the optical intensity of the reflected optical beam becomes minimum), and when beam spot SP traverses the mirror portion, the intensity modulation becomes a minimum (as a result, the optical intensity of the reflected light beam becomes maximum). Usually, even when the beam spot is at the center of the mirror portion, it also overlaps a portion of the adjacent track, and intensity modulation takes place in the overlapped portion. Consequently, in the RF signal, the maximum point on the bottom level does not become as high as the top level, and even near the maximum point, the radio frequency modulation component lasts. In the push-pull system, such tracking modulation components Ste have the same phase for RF signals SA and SD and RF signals SB and SC, and they have the opposite phase for RF signals (SA, SD) and RF signals (SB, SC).

In a conventional tracking error detector (FIG. 3), by performing the desired push-pull operation using analog operation circuits 214, 216, 218 for RF signals SA, SB, SC, SD obtained from light receiving regions A, B, C, D of the optical detector, it is possible to obtain a tracking error signal TE that represents the position error of the beam spot in the radial direction. However, in both low-speed reproduction and high-speed reproduction, after passing through the low-pass filter, tracking error signal TE is significantly attenuated (by about half), and the SN (signal-to-noise) characteristics degrade. This is a problem (see FIGS. 5 and 6). This is due to the fact that the top envelope component of the RF signal is nearly flat. Also, in the case of low-speed reproduction, the frequency of the RF signal and the frequency of the tracking signal component are rather close to each other, and it is hard to separate the two signals with a low-pass filter. As shown in FIG. 5, RF signal component RFn may be easily left in the tracking error signal TE.

For a CD (Compact Disc), DVD (Digital Versatile Disk), or other general optical disk, EFM (Eight to Fourteen Modulation) or EFM Plus is adopted as the modulation system of data recorded on the tracks, and the pit length is limited in the range of 3T–11T (T represents the length of 1 bit) so that the [2,10]RLL (Run-Length Limited) coding condition is met, that is, the length of continuous "0" is at least 2 and less then 11. Consequently, for a CD as an example, the frequency of the channel clock in the case of x1 reproduction is 4.32 MHz. On the other hand, the maximum frequency of RF signal in the case of 3T/3T is 720 kHz, and it decreases to about 196 kHz in the case of 11T/11T. In order to perform tracking servo correctly, it is preferred that such RF signal component in the tracking error signal be so small so that it may be ignored.

However, in a conventional tracking error detector, it is hard to separate or cut an RF signal component at about 196 kHz with respect to the tracking error signal TE obtained from tracking modulation component Ste usually at tens of kHz, even after passing a low-pass filter.

Also, when conversion is performed to a digital signal, in order to fit the input range of the A/D converter of the next stage, the amplitude of tracking error signal TE is increased by means of operation circuits 214, 216, 218 and amplifier 220. However, since the RF signal component is also amplified at the same time, the gain cannot be increased sufficiently. Also, since the RF signal component is mixed, the precision of the digital signal is low.

On the other hand, in high-speed reproduction, that is, x30 or a higher speed for a CD and x6 or a higher speed for a DVD, the bandwidth of the RF signal becomes 10 MHz or larger, and when the bandwidth of operation circuits 214, 216, 218 is only several MHz, these operation circuits act as a low-pass filter. As a result, not only is the RF signal component attenuated, but the tracking modulation component Ste as the base of tracking error signal TE is attenuated to ½, that is, to half the value. As a result, the SN decreases by 6 dB.

For a conventional focus error detector (FIG. 1), too, the focus error signal precision is not high, and the SN ratio is low. This is undesirable. The same problem exists also for various other types of servo error detecting systems.

There is a need to provide a servo error detector usable for an optical disk device that can realize higher precision, higher stability, lower cost, and higher stability. There is also a need to provide a servo error detector usable for an optical disk device that has good general applicability.

SUMMARY OF INVENTION

In accordance with one aspect of the invention, a servo error detector implementation for an optical disk has one or several RF signals output from an optical pickup input to detect the position error or optical servo error of a light beam on the signal recording surface of the optical disk. The servo error detector has an envelope detector that detects the top envelope and/or bottom envelope of each the RF signals and generates a top envelope signal and/or a bottom envelope signal that represents the top envelope and/or bottom envelope; an analog/digital converter that converts the analog top envelope signal and/or bottom envelope signal to a digital top envelope signal and/or bottom envelope signal; and a servo error signal generator that performs a digital operation treatment for said digital top envelope signal and/or bottom envelope signal to generate one or several servo error signals.

In the described servo error detector, by means of the envelope detector, the signal component needed for detecting the servo error contained in the RF signal given by the optical pickup is converted to a low-frequency signal in the form of the top envelope and/or bottom envelope of the RF signal. Then, by means of the analog/digital converter, it is converted to a digital signal, followed by an operation using an operation formula in the digital operation portion to generate a servo error signal.

In a described embodiment, the analog/digital converter simultaneously samples plural analog top envelope signals and/or bottom envelope signals, and using a time-division system, converts them to plural digital top envelope signals and/or bottom envelope signals. A described configuration has a gain control amplifier that amplifies the RF signal at a prescribed gain before feeding it to the envelope detector.

BRIEF DESCRIPTION OF THE DRAWINGS

FIG. 14 is a block diagram illustrating an equivalent circuit of an example of a servo error operation unit usable with the embodiment of FIG. 13.

FIG. 15 is a block diagram illustrating an equivalent circuit of another example of a servo error operation unit usable with the embodiment of FIG. 13.

FIGS. 16A–16C are waveform diagrams illustrating the operation of the tracking error operation unit.

DESCRIPTION OF THE EMBODIMENT

Figure 7:
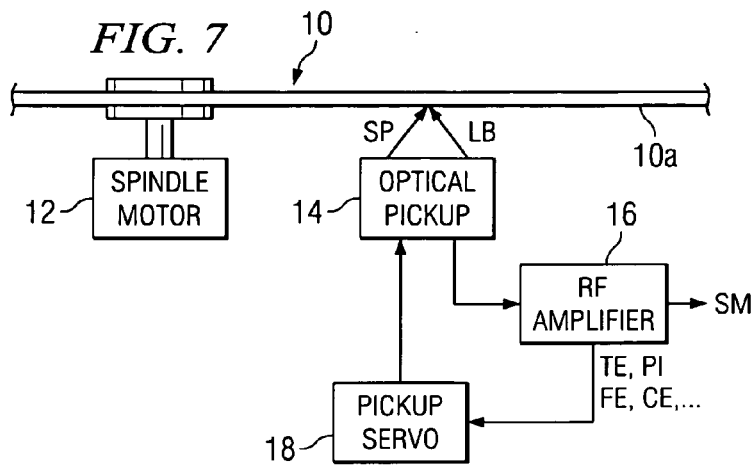
FIG. 7 is a schematic block diagram view of an optical disk device to which the present invention finds application.

Implementations of the invention are described with reference to the accompanying figures and in the context of an optical disk apparatus having the basic configuration shown in FIG. 7.

Optical disk 10 (see FIG. 7) is a toroidal-shaped circular disk having a central hole. Arrays of bits are arranged side-by-side in concentric (specifically, spiral) pit patterns to form tracks on a signal recording side 10a (underside in FIG. 7) of the disk. In reproduction, spindle motor 12 drives optical disk 10 at a constant linear velocity using, for example, a CLV (Constant Linear Velocity) technique.

Optical pickup 14 that can move in the disk radial direction is set facing signal recording surface 10a of optical disk 10. From optical pickup 14, a laser beam LB is focused and radiated onto signal recording surface 10a of optical disk 10. The light beam reflection from signal recording surface 10a is detected and subjected to photoelectric conversion so as to generate an electrical signal having a waveform corresponding to the bump and dip pattern of the pit line. The electrical signal output from optical pickup 14 is sent to RF amplifier 16. RF amplifier 16 generates a reproduced data signal as well as various servo error signals, such as tracking error signal TE and focus error signal FE, etc. Reproduced data signal SM output from RF amplifier 16 is input to a data signal processing unit (not shown in the figure), which performs signal treatment needed for decoding, error correction, etc. The servo error signals output from RF amplifier 16 are sent to pickup servo 18. Pickup servo 18 performs tracking control for positioning or following beam spot SP of laser beam LB on the track (pit line), focusing control for good focusing of beam spot SP to the size of about a pit, and other controls.

Figure 8:
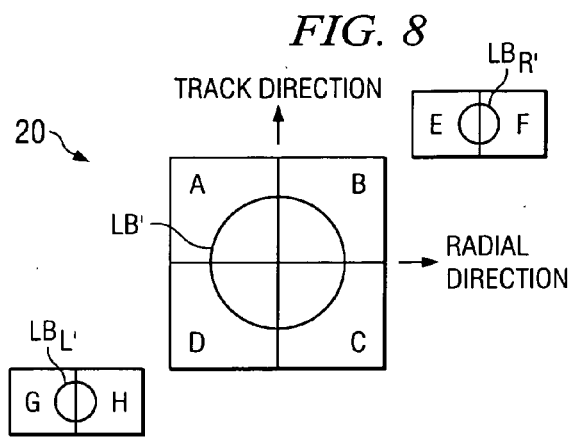
FIG. 8 is a schematic plan view illustrating an arrangement of light receiving regions of an example of a optical detector usable with the optical disk device of FIG. 7.

FIG. 8 shows an example of an optical detector employed as a photoelectric converting unit in optical pickup 14. The illustrated optical detector 20 is for a so-called three-beam system, and has four divided light receiving regions A, B, C, D and a pair of two divided light receiving regions G, H and E, F on the left/right sides. In the three-beam system, three light beams are focused and radiated from optical pickup 14 onto the signal recording surface 10a of optical disk 10, that is, a principal beam LB and left/right secondary beams $LB_L$, $LB_R$. From signal recording surface 10a, returned reflected light beam LB' corresponding to principal beam LB is focused and incident to the four divided light receiving regions A, B, C, D of the central portion, and returned reflected light beams $LB_L'$, $LB_R'$ corresponding to secondary beams $LB_L$, $LB_R$ are respectively focused and incident onto the left and right two divided light receiving regions G, H and E, F. Light receiving regions A, B, C, D, E, F, G, H generate respective RF signals SA, SB, SC, SD, SE, SF, SG, SH corresponding to the detected light intensity of the received light. These RF signals may be subject to I-V conversion in pickup 14 to form voltage signals, which take the level of reference voltage Vc applied from the outside to the pickup as a bias voltage as a reference.

Figure 9:
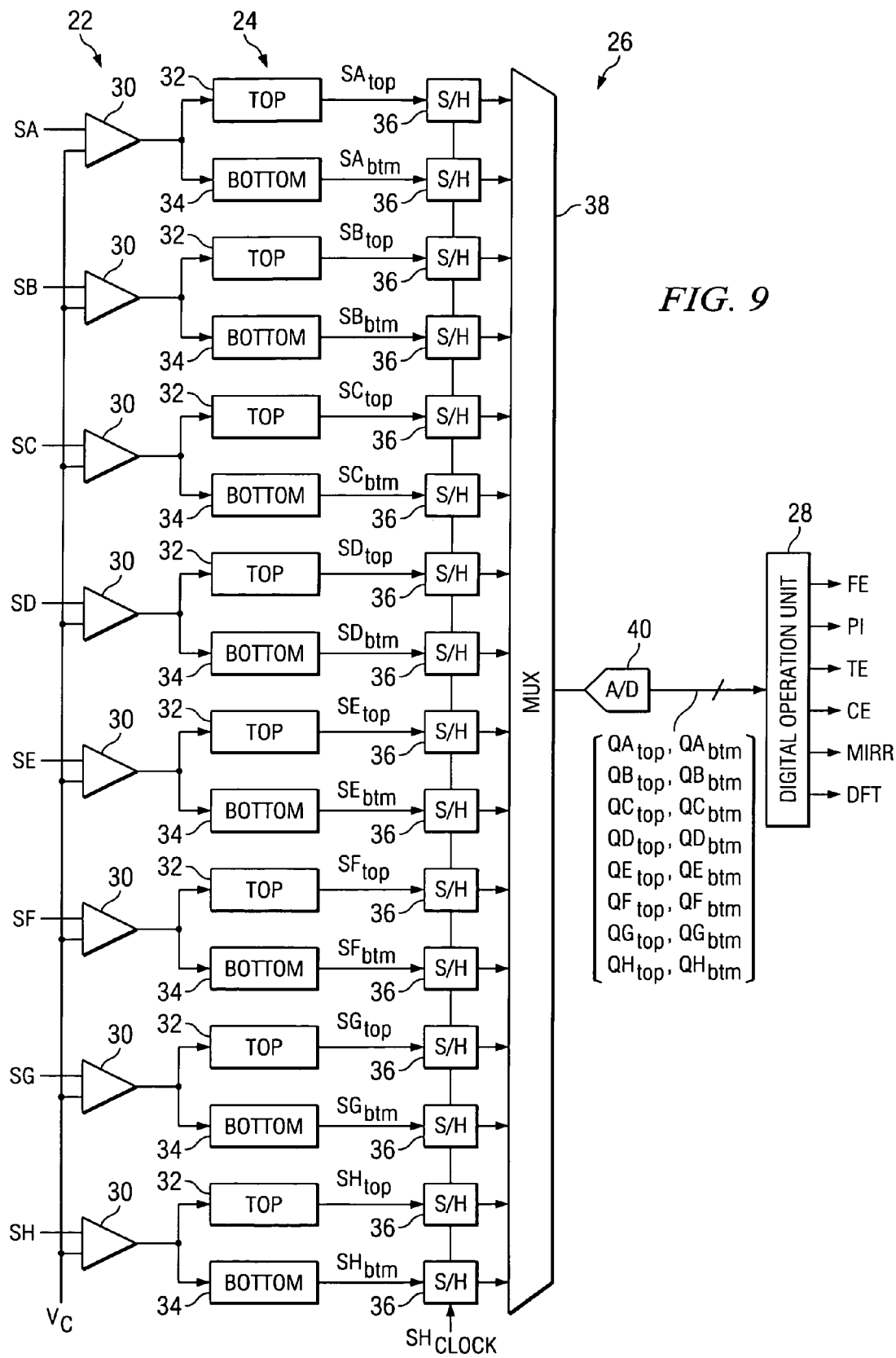
FIG. 9 is a block diagram illustrating an example of an embodiment of a servo error detector in accordance with the principles of the invention.

FIG. 9 is a diagram illustrating the configuration of an embodiment of a servo error detector in accordance with the principles of the invention. This servo error detector has an input amplifier 22, an envelope detecting unit 24, an analog/digital converting unit 26, and a digital operation unit 28.

Input amplification unit 22 has plural gain control amplifiers 30 that take the RF signals output from optical pickup 14 (FIG. 7) as their inputs, respectively. For example, these gain control amplifiers 30 may comprise operational amplifiers that take the same reference voltage Vc as that sent to optical pickup 14 as a reference level and amplify input RF signals SA–SH at prescribed gains, respectively. By means of gain amplification in a former stage, error in the amplitude is absorbed according to the specific type of optical disk, and it is possible to align the reference level of the RF signal to a prescribed value.

Envelope detecting unit 24 has a top envelope circuit 32 and a bottom envelope circuit 34 connected respectively to the output of each gain control amplifier 30.

Top envelope circuits 32 may, for example, be made of capacitor-type peak hold circuits. They detect the top envelopes of various RF signals SA–SH, and they output top envelope signals SAtop–SHtop representing the top envelope waveforms. Top envelope signals SAtop–SHtop contain little RF signal component. The droop rate of the peak hold circuit in each top envelope circuit is set appropriately to enable following the top envelope waveform of the RF signal. In particular, when optical disk 10 is tilted or when the optical axis of the objective lens in pickup 14 deviates, the top level of the RF signal oscillates. Consequently, the droop rate may be selected such that it can also follow such oscillation waveform of the top level.

Bottom envelope circuits 34 may also be made, for example, of capacitor type peak-hold circuits. They detect the bottom envelopes of various RF signals SA–SH, and output bottom envelope signals SAbtm–SHbtm that represent the bottom envelope waveforms. The bottom envelope signals SAbtm–SHbtm contain little RF signal component. The droop rate of the peak-hold circuit of each bottom envelope circuit is selected appropriately so that it can follow the bottom envelope of the RF signal, and in particular, it can effectively follow the tracking modulation component in the case of track jump.

Outputs of top envelope circuits 32 and bottom envelope circuits 34 are sent through sample-hold circuits 36 in analog/digital converting unit 26 to the corresponding input terminals of multiplexer 38. The system clock or a clock for decoding may be used as a sampling clock SHclock signal input to the sample-hold circuits 36. The frequency of the sampling clock should preferably be at least twice the bandwidth of the signal needed in servo control. Usually, a frequency of several hundred kHz is enough.

The output signals from all (16 in this example) top envelope circuits 32 and bottom envelope circuits 34 that function with respect to input RF signals SA–SH (that is, top envelope signals SAtop–SHtop and bottom envelope signals SAbtm–SHbtm) are input to multiplexer 38. Then, from these (16) input signals, one signal is selected at a time or in each cycle and is transferred to A/D converter 40 in the next stage. For example, if the sampling frequency is 200 kHz, to execute all A/D conversions of the 16 signals in one sampling clocking, the switching speed in multiplexer 38 and the A/D conversion speed in A/D converter 40 should be 3.2 MHz or higher. Also, because usually an 8-bit A/D converter is used in the next-stage servo controller, it is preferred that the resolution in A/D converter 40 have the same or higher precision.

In analog/digital converting unit 26, analog top envelope signals SAtop–SHtop and bottom envelope signals SAbtm––SHbtm corresponding to all of input RF signals SA–SH are converted at the same time with a time-division system to digital top envelope signals QAtop–QHtop and bottom envelope signals QAbtm–QHbtm, respectively.

Digital operation unit 28 is comprised of general-purpose digital circuits. For top envelope signals QAtop–QHtop and bottom envelope signals QAbtm–QHbtm output from analog/digital converting unit 26, by performing programmable digital operation treatment, it is possible to generate various servo error signals.

Figure 10:
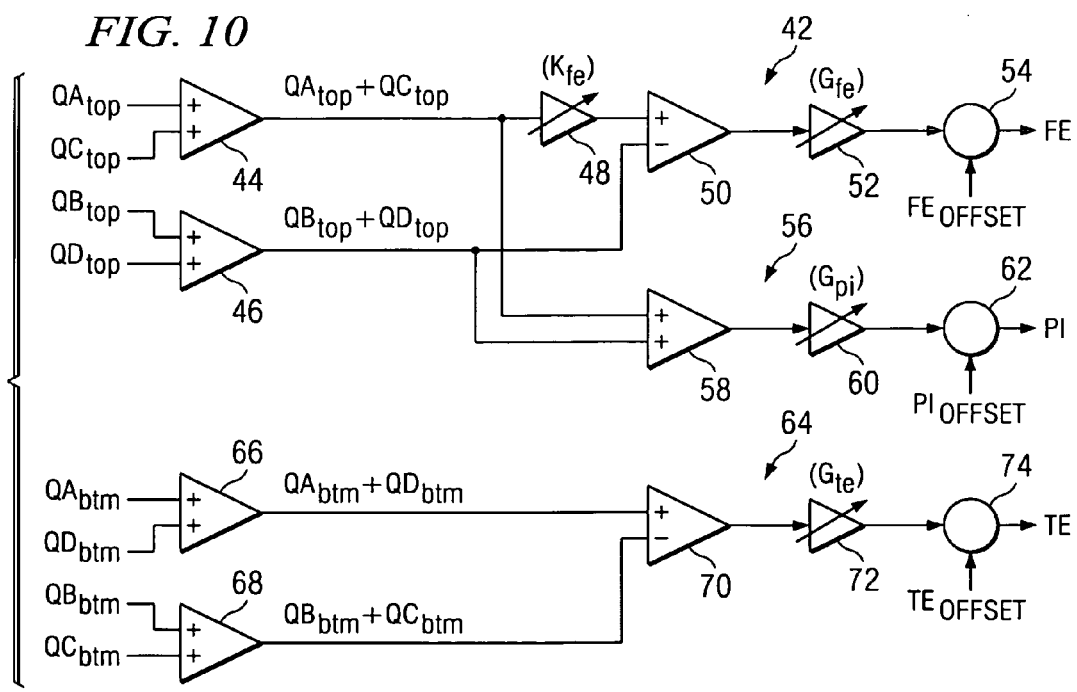
FIG. 10 is a block diagram illustrating an equivalent circuit of an example of a servo error operation unit usable with the embodiment.

FIG. 10 is a diagram illustrating an equivalent circuit of the digital operation treatment for generating focus error signal FE, pull-in signal PI and tracking error signal TE in digital operation unit 28.

In focus error operation unit 42, the following equation (3) may be used to calculate a digital focus error signal FE using an astigmatic aberration method:

$$FE = Gfe\{Kfe(QAtop+QCtop)-(QBtop+QDtop)\}-FEoffset \quad (3)$$

In the equivalent circuit, a focus error operation unit 42 is comprised of adders 44, 46, coefficient multiplier 48, subtractor 50, gain control amplifier 52 and offset adjusting circuit 54. Adder 44 takes the sum of top envelope signals QAtop and QCtop obtained from light receiving regions A and C, and generates sum signal (QAtop+QCtop). Adder 46 takes the sum of top envelope signals QBtop and QDtop obtained from light receiving regions B and D, and generates sum signal (QBtop+QDtop). Coefficient multiplier 48 multiplies coefficient Kfe for correcting the balance of comma aberration in the astigmatic aberration method with sum signal (QAtop+QCtop). Subtractor 50 takes the difference of said two sum signals Kfe(QAtop+QCtop) and (QBtop+QDtop) to generate difference signal {Kfe(QAtop+QCtop)−(QBtop+ QDtop)}. For the difference signal, that is, the basic focus error signal, gain control amplifier 52 increases the gain by Gfe-fold, and offset adjusting circuit 54 cancels offset FEOffset.

In the astigmatic aberration method, when the objective lens in pickup 14 approaches optical disk 10, the levels of RF signals SA and SC generated from light receiving regions A and C in optical detector 20 are higher than the levels of RF signals SB and SD generated from light receiving regions B and D, and the focus error signal FE is offset to the + side. On the other hand, when the objective lens in pickup 14 goes away from optical disk 10, the levels of RF signals SB and SD become higher than the levels of RF signals SA and SC, and focus error signal FE offsets to the − side. In this case, focusing servo is carried out such that the level of focus error signal FE approaches zero.

Operation of the pull-in operation unit 56 to generate digital pull-in signal PI may be performed according to the following equation (4):

$$PI = Gpi\{(QAtop+QCtop)+(QBtop+QDtop)\}-PIoffset \quad (4)$$

In the shown equivalent circuit, pull-in operation unit 56 has adders 44, 46, 58, gain control amplifier 60 and offset adjusting circuit 62. Adder 58 takes the sum of the sum signals from adders 44 and 46 and outputs grand sum signal {(QAtop+QCtop)+(QBtop+QDtop)}. For the grand sum signal of the basic pull-in signal, gain control amplifier 60 increases the gain by Gpi-fold, and offset adjusting circuit 62 cancels offset PIOffset.

The level varies for pull-in signal PI obtained in pull-in operation unit 56 corresponding to the distance between optical disk 10 and pickup 14. That is, the nearer the pickup 14 is to optical disk 10, the higher the levels of RF signals SA, SB, SC, SD and hence the higher the level of pull-in signal PI. For example, in the initialization performed right after the power source is turned ON, pull-in signal PI is taken as a monitoring signal, and pickup 14 can be moved appropriately near optical disk 10.

Tracking error operation unit 64 may be operated using the push-pull system to generate digital focus error signal FE in accordance with the following equation (5):

$$TE = Gte\{QAbtm+QDbtm)-(QBbtm+QCbtm)\}-TEoffset \quad (5)$$

In the equivalent circuit shown in FIG. 10, the tracking error operation unit 64 is comprised of adders 66, 68, subtractor 70, gain control amplifier 72 and offset adjusting circuit 74. Adder 66 takes the sum of bottom envelope signals QAbtm and QDbtm obtained from light receiving regions A and D, and generates sum signal (QAbtm+QDbtm). Adder 68 takes the sum of bottom envelope signals QBbtm and QCbtm obtained from light receiving regions B and C, and generates sum signal (QBbtm+QCbtm). Subtractor 70 takes the difference between the two sum signals to generate difference signal {(QAbtm+QDbtm)−(QBbtm+ QCbtm)}. For the difference signal, that is, the basic tracking error signal, gain control amplifier 72 increases the gain by Gte-fold, and offset adjusting circuit 74 cancels offset TEOffset.

Figure 1:
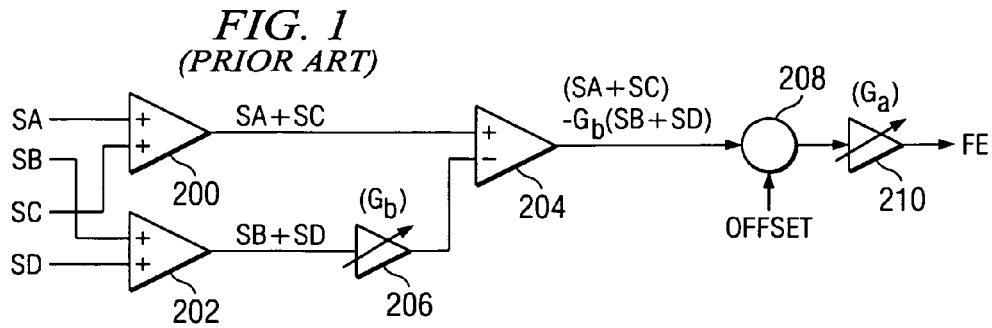
FIG. 1 (prior art) is a block diagram illustrating a conventional focus error detector.
Figure 2:
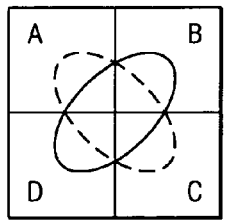
FIG. 2 is a schematic diagram of a light detector usable in an optical disk device.
Figure 3:
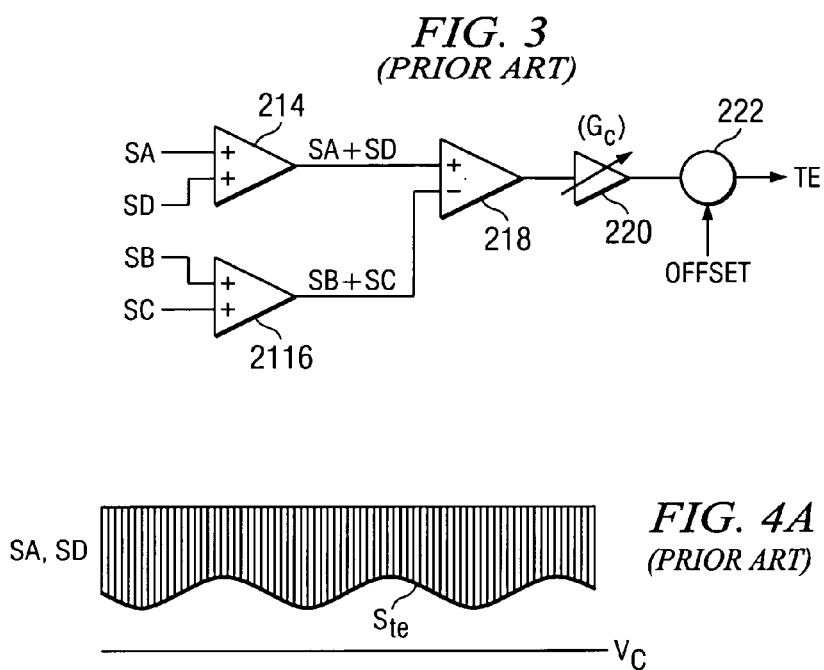
FIG. 3 (prior art) is a block diagram illustrating a conventional tracking error detector.
Figure 4A:
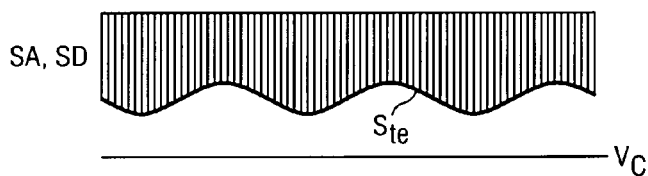
FIGS. 4A and 4B are diagrams illustrating schematically the waveforms of the electrical signals obtained from the light receiving regions of the light detector.
Figure 4B:
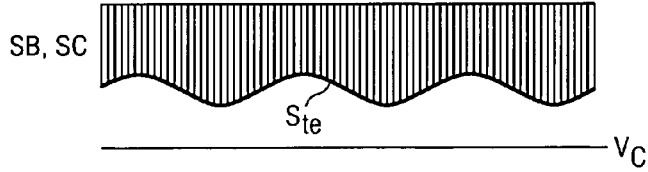
Figure 5:
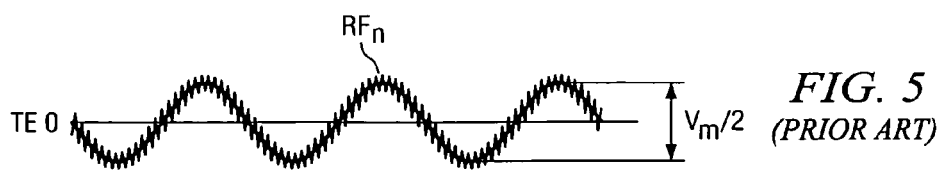
FIG. 5 is a waveform diagram illustrating a problem in operation of the tracking error detector of FIG. 3.
Figure 6:
FIG. 6 is a waveform diagram illustrating a problem in operation of the tracking error detector of FIG. 3.
Figure 11A:
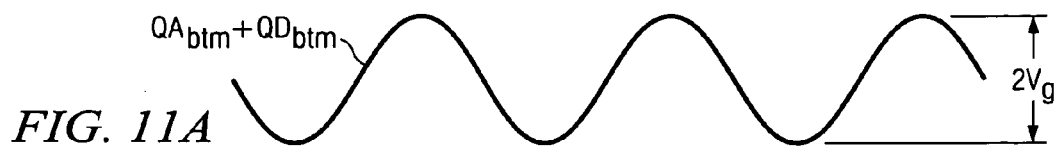
FIGS. 11A–11C are waveform diagrams illustrating the operation of a tracking error operation unit in the embodiment.
Figure 11B:
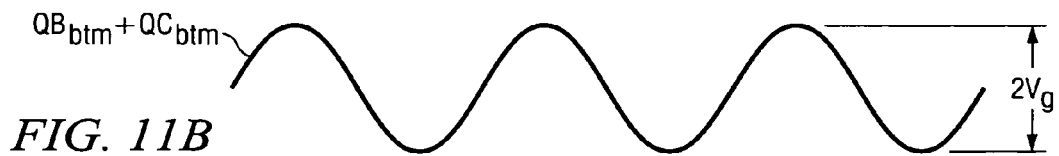
Figure 11C:
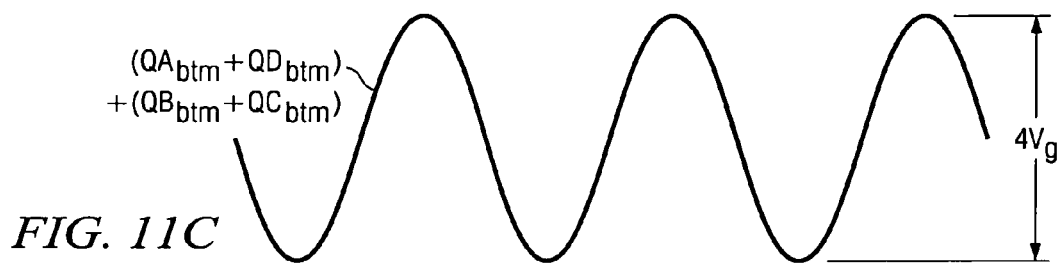

In the following, the function of signal treatment in tracking error operation unit 64 is briefly explained. In the case of track jump, tracking modulation component Ste appears on the bottoms of RF signals SA, SB, SC, SD obtained from light receiving regions A, B, C, D of optical detector 20 (See FIGS. 4A, 4B and 8). In envelope detecting unit 24 (FIG. 9), analog bottom envelope signals SAbtm, SBbtm, SCbtm, SDbtm derived from RF signals SA, SB, SC, SD have a peak-to-peak value (hereinafter referred to as Vg) nearly equal to tracking modulation component Ste. Digital bottom envelope signals QAbtm, QBbtm, QCbtm, QDbtm generated in analog/digital converting unit 26 also have a peak-to-peak value (Vg) equal to the analog signals in the waveform. Consequently, as shown in FIGS. 11A–11C, the peak-to-peak value of the sum signals (QAbtm+QDbtm) and (QBbtm+QCbtm) obtained from adder circuits 66, 68 in tracking error operation unit 64 is doubled to a magnitude of (2 Vg). As the two sum signals (QAbtm+QDbtm) and (QBbtm+QCbtm) have phases opposite each other, the peak-to-peak value of the difference signal {(QAbtm+QDbtm)–(QBbtm+QCbtm)} is doubled to a magnitude of (4 Vg) as shown in FIG. 11.

In digital operation unit 28, in addition to the focus error signal FE, pull-in signal PI and tracking error signal TE, various servo error signals, such as center error signal CE, mirror signal MIRR, defect detecting signal DFT, etc. can also be generated in a digital operation treatment.

Figure 12:
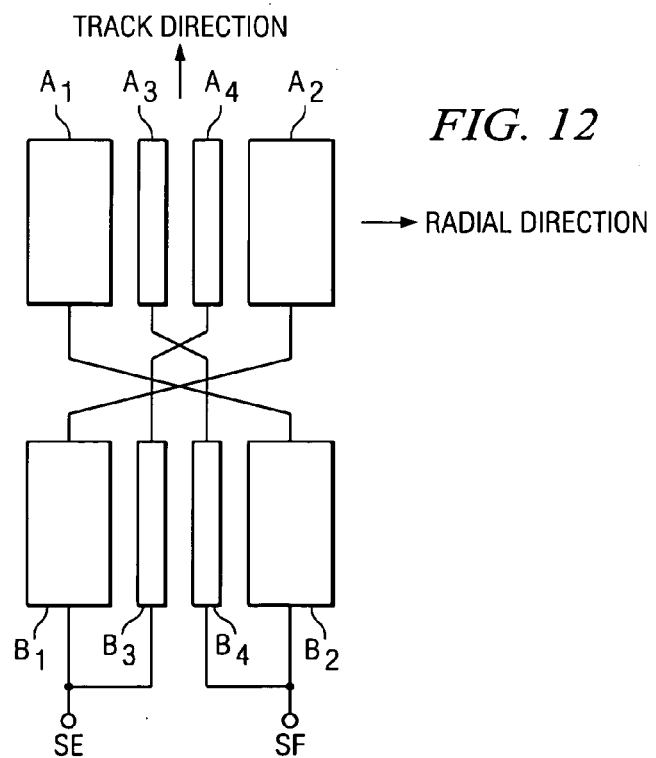
FIG. 12 is a schematic plan view illustrating another example of an arrangement of light receiving regions usable with the optical disk device.

FIG. 12 shows an arrangement of light receiving regions of optical pickup 14 usable in connection with other implementations in accordance with the principles of the invention. This configuration of light receiving regions is of the so-called coupler type. The light beam reflected from optical disk 10 (FIG. 7) is first optically incident onto light receiving regions A1, A3, A4, A2 in a first optical stage. The light beam reflected in the first stage is incident onto light receiving regions B1, B3, B4, B2 in a second optical stage. In the first stage, a same-phase relationship exists between left-side regions A1 and A3 and between right-side regions A2 and A4, and an opposite-phase relationship exists between left-side regions A1 and A3 and right-side regions A2 and A4. In the second stage, too, a same-phase relationship exists between left-side regions B1 and B3 and between right-side regions B2 and B4, and an opposite-phase relationship exists between left-side regions B1 and B3 and right-side regions B2 and B4. In addition, a same-phase relationship exists between the left-side regions A1, A3 of the first stage and right-side regions B2, B4 of the second stage, and a same-phase relationship exists between the right-side regions A2, A4 of the first stage and the left-side regions B1, B3 of the second stage.

RF signals SA1, SA3, SA4, SA2 and SB1, SB3, SB4, SB2 are generated corresponding to the light intensity from the respective light receiving regions A1, A3, A4, A2 and B1, B3, B4, B2. These RF signals are suitably voltage signals obtained by I-V conversion in pickup 14, with the reference voltage Vc applied as a bias voltage on the pickup from the outside taken as a reference level.

An analog operation circuit annexed to pickup 14 is usually used to carry out operational treatment of the following equations (6), (7), (8), (9) to provide four types of sum RF signals PD1, PD2, SE, SF as outputs from pickup 14.

$$PD1 = SA1 + SA3 + SA4 + SA2 \quad (6)$$

$$PD2 = SB1 + SB3 + SB4 + SB2 \quad (7)$$

$$SE = SA2 + SA4 + SB1 + SB3 \quad (8)$$

$$SF = SA1 + SA3 + SB2 + SB4 \quad (9)$$

Figure 13:
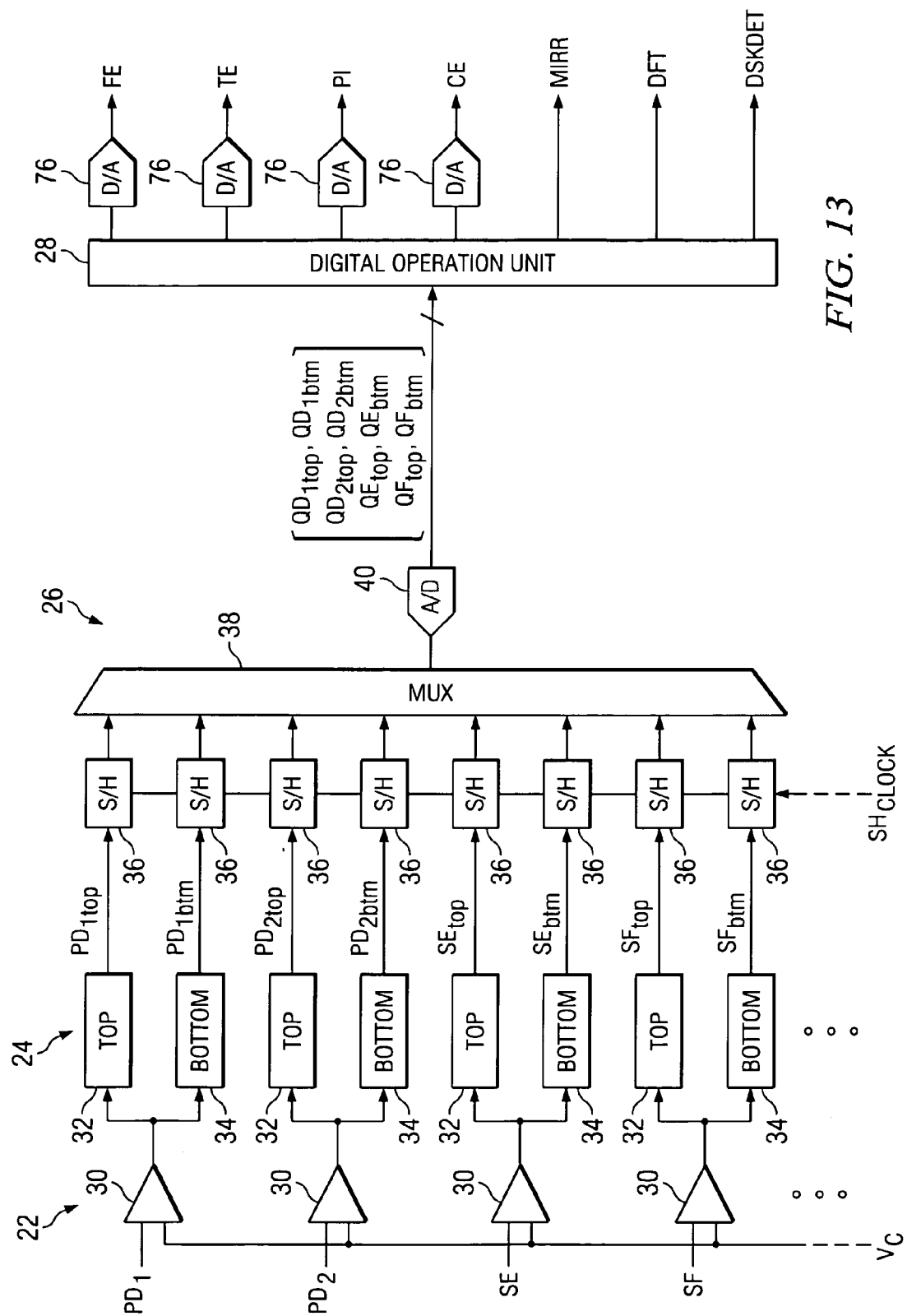
FIG. 13 is a block diagram illustrating an example of another embodiment of a servo error detector in accordance with the principles of the invention.

As shown in FIG. 13, RF signals PD1, PD2, SE, SF output from the coupler type pickup 14 may be input to the servo error detector in this embodiment as is. In this case, in input amplifying unit 22 and envelope detecting unit 24, gain control amplifier 30, top envelope circuit 32 and bottom envelope circuit 34 of the four input RF signals are used.

Consequently, in envelope detecting unit 24, from input RF signals PD1, PD2, SE, SF, analog top envelope signals PD1top, PD2top, SEtop, SFtop and bottom envelope signals PD1btm, PD2btm, SEbtm, SFbtm are generated. Then, in analog/digital converting unit 26, using a time-division system, top envelope signals PD1top, PD2top, SEtop, SFtop, and bottom envelope signals PD1btm, PD2btm, SEbtm, SFbtm are simultaneously converted to digital top envelope signals QD1top, QD2top, QEtop, QFtop, and bottom envelope signals QD1btm, QD2btm, QEbtm, QFbtm, respectively.

In digital operation unit 28, from analog/digital converting unit 26, digital top envelope signals QD1top, QD2top, QEtop, QFtop and bottom envelope signals QD1btm, QD2btm, QEbtm, QFbtm are taken as input signals and are subject to programmable digital operation treatment to generate various types of servo error signals.

FIG. 14 illustrates the equivalent circuits of the digital operation treatment for generating focus error signal FE and pull-in signal PI in digital operation unit 28 in this embodiment.

Focus error operation unit 78 uses the following equation (10) in an operation to generate digital focus error signal FE:

$$FE = Gfe\{(Kfe \cdot QD1top - QD2top)\} FEoffset \quad (10)$$

The equivalent circuit of focus error operation unit 78 has coefficient multiplier 80, subtractor 82, gain control amplifier 84, and offset adjusting circuit 86. Coefficient multiplier 80 multiplies coefficient Kfe for comma aberration balance correction to top envelope signal QD1top derived from RF signal PD1. Subtractor 82 takes the difference between output signal (Kfe*QD1top) of coefficient multiplier 80 and top envelope signal QD2top derived from RF signal PD2 to generate difference signal (Kfe*QD1top–QD2top). This difference signal is taken as a basic focus error signal, and it is amplified by gain control amplifier 84 with a gain of Gfe-fold, and offset adjusting circuit 86 cancels offset FEoffset.

Pull-in operation unit 88 uses the following equation (11) in an operation to generate digital pull-in signal PI:

$$PI = Gpi \cdot (QD1top + QD2top) - PIoffset \quad (11)$$

The equivalent circuit of pull-in operation unit 88 has adder 90, gain control amplifier 92 and offset adjusting circuit 94. Adder 90 takes the sum of two top envelope signals QD1top and QD2top to generate sum signal (QD1top+QD2top). This sum signal, that is, the basic pull-in signal, is amplified by gain control amplifier 92 with a gain of Gpi-fold, and offset PIoffset is canceled with offset adjusting circuit 94. The obtained signal is output as pull-in signal PI.

FIG. 15 illustrates an equivalent circuit of the digital operation treatment for generating tracking error signal TE in digital operation unit 28 in this embodiment. This tracking error operation unit 96 uses the top hold push-pull (TPP) method in calculating following equation (12) to generate digital tracking error signal TE:

$$+Gal \cdot EQR(QEbtm - QFbtm)] - TEoffset \quad (12)$$

The equivalent circuit of tracking error operation unit 96 is comprised of coefficient multipliers 98, 100, subtractors 102, 104, 106, 108, equalizer 110, coefficient multiplier 112, adder 114, gain control amplifier 116 and offset adjusting circuit 118 connected as shown.

Coefficient multipliers 98, 100 and subtractors 102, 104 are circuits for compensating offset corresponding to variation in the top level in RF signals SE, SF. When optical disk 10 is tilted or the optical axis of the objective lens in pickup 14 deviates, as shown in FIGS. 16A–16C, the top level in the RF signal oscillates, and the oscillation component also reaches the bottom level, so that in bottom-side tracking modulation component Ste, offset also appears corresponding to variation of the top level. In this embodiment, variation of top level SEtw in the RF signal is separated as top envelope signal Stop. Top envelope signal Stop is multiplied with coefficient Kte that indicates the degree of influence of offset, and the obtained signal Kte*Stop is subtracted from bottom envelope signal Sbtm, and the offset of tracking modulation component Ste corresponding to variation Stw of the top level is cancelled. Also, such offset compensation is carried out by means of digital operation treatment.

In tracking error operation unit 96, from the outputs of subtractors 102, 104, the influence of the top level is removed to obtain corrected bottom envelope signals (QEbtm−Kte*QEtop) and (QFbtm−Kte*QFtop), respectively. Consequently, one may take the difference signal {(QEbtm−Kte*QEtop)−(QFbtm−Kte*QFtop)} obtained in the output of subtractor 106 as the basic tracking error signal.

In this embodiment, there is also a circuit for adjusting the frequency characteristics of tracking error signal TE. This frequency characteristic adjusting circuit is comprised of subtractor 108, equalizer 110 and gain control amplifier 112. Subtractor 108 takes the difference between two bottom envelope signals QEbtm and QFbtm, and outputs the difference signal (QEbtm−QFbtm) as alignment signal AL. Equalizer 110 enhances (amplifies) or attenuates the desired frequency bandwidth to change the frequency characteristics of alignment signal AL. Alignment signal AL, that is, EQR (QEbtm−QFbtm), having the desired frequency characteristics is amplified by gain control amplifier 112 with a gain of Gal-fold. Then, the signal is added by adder 114 to the basic tracking error signal from subtractor 106. The basic tracking error signal that has frequency characteristics adjusted is amplified by gain control amplifier 116 with a gain of Gte-fold, and offset adjusting circuit 118 cancels offset TEoffset.

Figure 17:
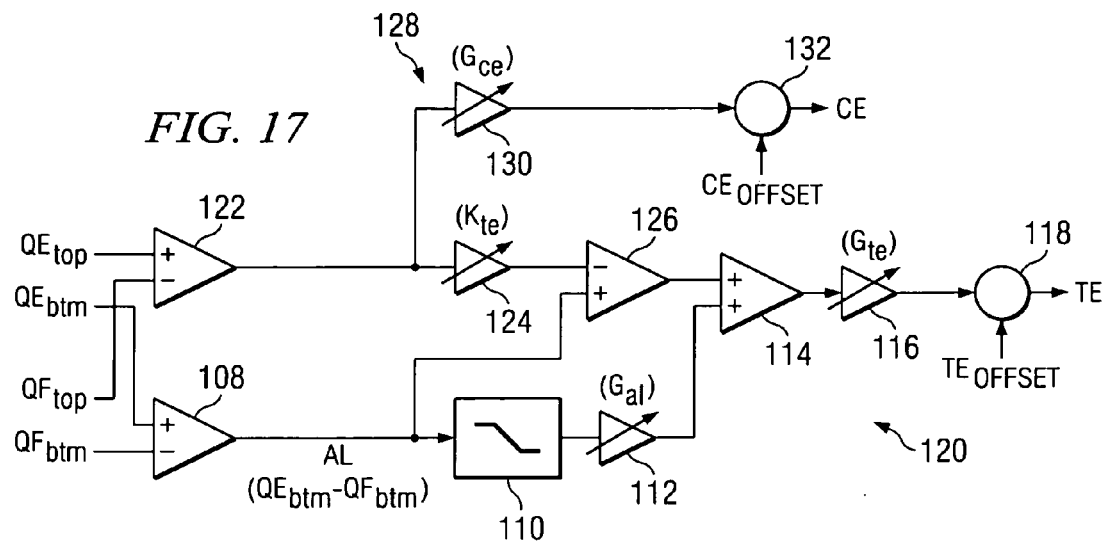
FIG. 17 is a block diagram illustrating an equivalent circuit another embodiment of a servo error operation unit.

FIG. 17 illustrates an equivalent circuit for digital operation treatment in another embodiment for generating tracking error signal TE in digital operation unit 28. This tracking error operation unit 120 uses the following equation (13) in an operation to generate digital tracking error signal TE:

$$TE = Gte[\{(QEbtm-QFbtm)-Kte(QEtop-QFbtm)\} + Gal \cdot EQR(QEbtm-QFbtm)] - TEoffset \quad (13)$$

The equivalent circuit of tracking error operation unit 120 comprises subtractors 108, 122, 126, equalizer 110, coefficient multipliers 112, 124, adder 114, gain control amplifier 116 and offset adjusting circuit 118 connected as shown. In this embodiment, difference signal (QEbtm−QFbtm) obtained in the output of subtractor 108 is not only sent as alignment signal AL to equalizer 110, but is also sent as a tracking error signal before correction to the positive-side input terminal of subtractor 126. On the other hand, subtractor 122 takes the difference between two top envelope signals QEtop and QFtop to generate difference signal (QEtop−QFtop). This difference signal is multiplied by coefficient Kte that indicates the degree of influence of offset using coefficient multiplier 124, and the obtained signal Kte (QEtop−QFtop) is sent to the negative-side input terminal of subtractor 126. Subtractor 126 takes the difference between the two input signals by means of subtraction, and outputs difference signal {(QEbtm−QFbtm)−Kte (QEtop−QFtop)}. From the following equation (14), one can see that the output of subtractor 126 is equivalent to the output of subtractor 106 in tracking error operation unit 96 shown in FIG. 15. Modification can be performed easily by simply changing the software.

$$(QEbtm-QFbtm)-Kte \cdot (QEtop-QFtop) = (QEbtm-Kte \cdot QEtop)-(QFbtm-Kte \cdot QFtop) \quad (14)$$

FIG. 17 also shows an equivalent circuit of center error operation unit 128. This center error operation unit 128 uses the following equation (15) to calculate digital center error CE:

$$CE = Gce(QEtop-QFtop) - CEoffset \quad (15)$$

The equivalent circuit of center error operation unit 128 has subtractor 122, gain control amplifier 130, and offset adjusting circuit 132 connected as shown. Subtractor 122 is used together with tracking error operation unit 120 in taking the difference between two top envelope signals QEtop and QFtop, and outputs the difference signal (QEtop−QFtop). This difference signal (QEtop−QFtop) goes through gain control amplifier 130 and offset circuit 132 for gain adjustment and offset adjustment for the center error to get center error CE. This center error signal CE is used as the servo error signal that represents the position error of optical pickup 14 (in particular, the objective lens) in the radial direction.

Figure 18:
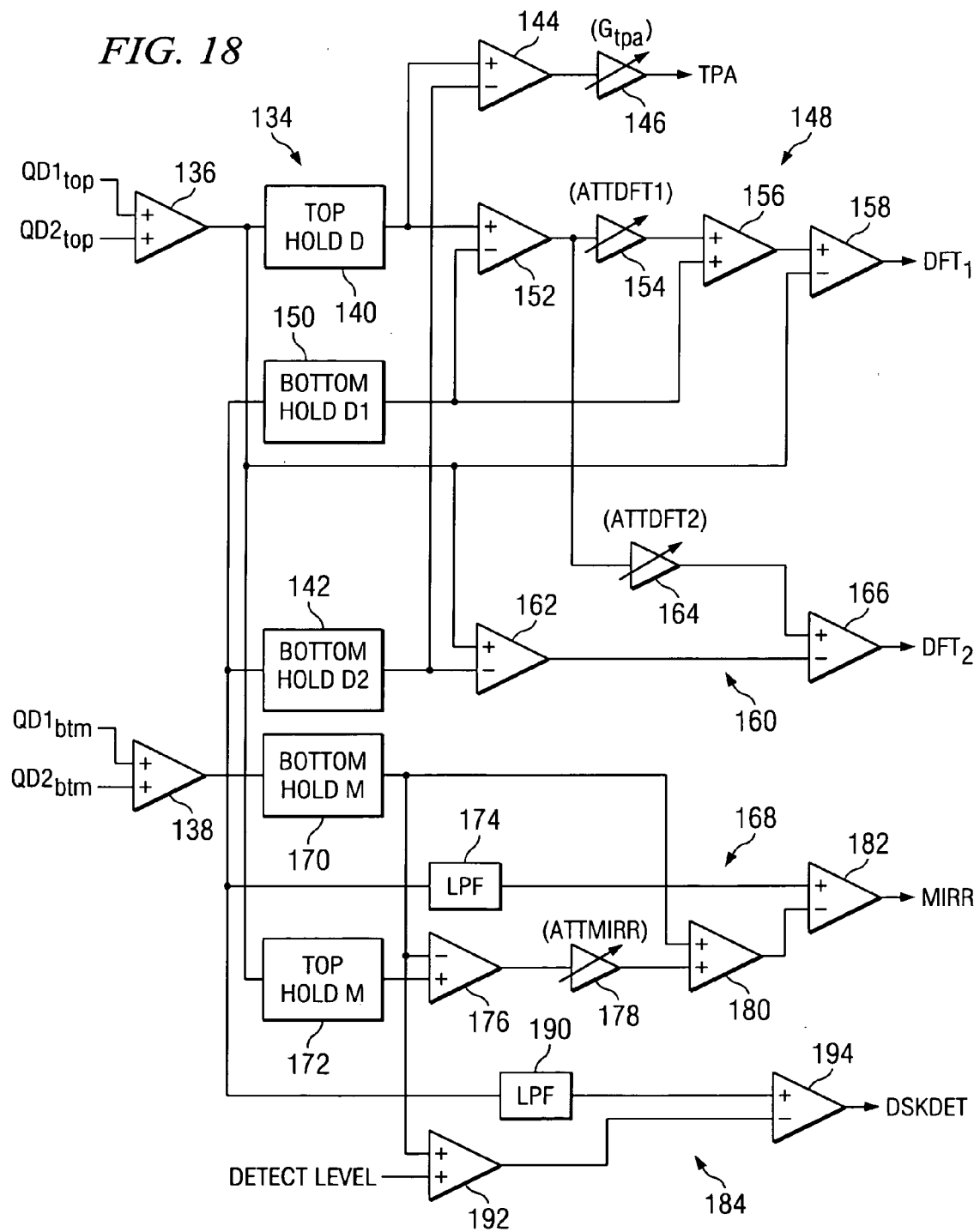
FIG. 18 is a block diagram illustrating an equivalent circuit of another embodiment of a servo error operation unit.

FIG. 18 illustrates an equivalent circuit in digital operation unit 28 for generating RF amplitude detection signal TPA, disk defect detection signal DFT, mirror detection signal MIRR and disk detection signal DSKDET.

RF amplitude detecting unit 134 uses the following equation (16) to generate digital RF amplitude detection signal TPA:

$$TPA = Gtpa\{TopHold\ D(QD1top+QD2top) - BottomHold\ D2(QD1btm+QD2btm)\} \quad (16)$$

The equivalent circuit of the RF amplitude detection unit 134 is comprised of adders 136, 138, top-hold circuit 140, bottom-hold circuit 142, subtractor 144, and gain control amplifier 146 connected as shown. Adder 136 takes the sum of two top envelope signals QD1top and QD2top, and outputs sum signal (QD1top+QD2top). Adder 138 takes the sum of two bottom envelope signals QD1btm and QD2btm, and outputs sum signal (QD1btm+ QD2btm). Top-hold circuit 140 holds the top level constant for the sum signal (QD1top+QD2top), and outputs top-hold signal TopHold D (QD1top+QD2top). Bottom-hold circuit 142 holds the bottom level constant for sum signal (QD1btm+QD2btm), and outputs bottom-hold signal BottomHold D2 (QD1btm+ QD2btm). Subtractor 144 subtracts bottom-hold signal BottomHold D2(QD1btm+QD2btm) from top-hold signal TopHold D(QD1top+QD2top), and outputs difference signal {TopHold D(QD1top+QD2top)−BottomHold D2(QD1btm+ QD2btm)}. The difference signal is amplified by gain control amplifier 146 with a gain of Gtpa-fold. This RF amplification detection signal TPA represents the amplitude or peak-to-peak value of the RF signal.

First and second disk defect detecting units 148 and 160 use the following equations (17), (18) to calculate disk defect detection signals DFT1 and DFT2:

$$DFT1 = (QD1top + QD2top) < \\ ATTDFT1\{TopHold\ D\ (QD1top + QD2top) - \\ BottomHold\ D1\ (QD1btm + QD2btm)\} + \\ BottomHold\ D1\ (QD1btm + QD2btm) \quad (17)$$

$$DFT2 = \{(QD1top + QD2top) - \\ BottomHold\ D2\ (QD1btm + QD2btm)\} > \\ ATTDFT2\{TopHold\ D\ (QD1top + QD2top) - \\ BottomHold\ D1\ (QD1btm + QD2btm)\} \quad (18)$$

In the equivalent circuit, first disk defect detecting unit 148 is comprised of adders 136, 138, top-hold circuit 140, bottom-hold circuit 150, subtractor 152, attenuator 154, adder 156, and comparator 158 connected as shown. Bottom-hold circuit 150 holds the bottom level constant for sum signal (QD1btm+QD2btm), and outputs BottomHold D1(QD1btm+QD2btm). Subtractor 152 subtracts bottom-hold signal BottomHold D1(QD1btm+QD2btm) from top-hold signal TopHold D(QD1top+QD2top), and outputs difference signal {TopHold D(QD1top+QD2top)−BottomHold D1(QD1btm+QD2btm)}. This difference signal is attenuated by attenuator 154 with an attenuation of ATTDFT1-fold. Adder 156 takes the sum of the output signal of attenuator 154 and bottom-hold signal BottomHold D1(QD1btm+QD2btm) from bottom-hold circuit 150. Comparator 158 compares the output signal of adder 156 with the output signal of adder 136, and corresponding to the relative magnitudes, outputs logic value 1 or 0 as first disk defect detection signal DFT1. This first disk defect detection signal DFT1 has logic value "1" when the top level of the RF signal is normal, and it has logic value "0" when the top level decreases abnormally (when the intensity of the light reflected from the optical disk is abnormally low).

Second disk defect detecting unit 160 is comprised of adders 136, 138, top-hold circuit 140, bottom-hold circuits 142, 150, subtractor 162, attenuator 164, and comparator 166 connected as shown. Subtractor 162 takes the difference between sum signal (QD1top+QD2top) from adder 136 and bottom-hold signal BottomHold D2(QD1btm+QD2btm), and outputs difference signal {(QD1top+QD2top)−BottomHold D2(QD1btm+QD2btm)}. Difference signal {TopHold D(QD1top+QD2top)−BottomHold D1(QD1btm+QD2btm)} from subtractor 152 is attenuated by attenuator 164 with an attenuation of ATTDFT2-fold. Comparator 166 compares the output signal of attenuator 164 with the output signal of subtractor 162, and, corresponding to the relative magnitudes, outputs logic value 1 or 0 as second disk defect detection signal DFT2. This second disk defect detection signal DFT2 has logic value "1" when the top level of the RF signal is normal, and it has logic value "0" when the top level decreases abnormally (when the intensity of the light reflected from the optical disk is abnormally low).

Mirror detecting unit 168 uses the following equation (19) to calculate digital mirror detection signal MIRR:

$$MIRR = LPF\{BottomHold\ M(QD1btm + QD2btm)\} > \\ [BottomHold\ M(QD1btm + QD2btm) + \\ ATTMIRR\{TopHold\ M(QD1top + QD2top) - \\ BottomHold\ M(QD1btm + QD2btm)\}] \quad (19)$$

In the equivalent circuit, mirror detecting unit 168 is comprised of adders 136, 138, bottom-hold circuit 170, top-hold circuit 172, low-pass filter 174, subtractor 176, attenuator 178, adder 180 and comparator 182 connected as shown.

Bottom-hold circuit 170 holds the bottom level constant for sum signal (QD1btm+QD2btm) from adder 138, and outputs bottom-hold signal BottomHold M(QD1btm+QD2btm). Top-hold circuit 172 holds the top level constant for the sum signal (QD1top+QD2top) from adder 136, and outputs top-hold signal TopHold M(QD1top+QD2top). Subtractor 176 subtracts bottom-hold signal BottomHold M(QD1btm+QD2btm) from top-hold signal TopHold M(QD1top+QD2top), and outputs the difference signal. This difference signal is attenuated by attenuator 178 with an attenuation of ATTMIRR-fold. Adder 180 takes the sum of the output signal of attenuator 178, ATTMIRR {TopHold M(QD1top+QD2top)−BottomHold M(QD1btm+QD2btm)}, and bottom-hold signal BottomHold M(QD1btm+QD2btm) from bottom-hold circuit 170, and outputs the sum signal. On the other hand, low-pass filter 174 attenuates or removes the RF component from the sum signal (QD1btm+QD2btm) from adder 138, and outputs the low-frequency component. Comparator 182 compares the output signal of low-pass filter 174, LPF {BottomHold M(QD1btm+QD2btm)}, with the output signal of adder 180, [BottomHold M(QD1btm+QD2btm)+ATTMIRR {TopHold M(QD1top+QD2top)−BottomHold M(QD1btm+QD2btm) }], and, corresponding to the relative magnitudes, outputs logic value 1 or 0 as mirror detection signal MIRR. In the case of track jump, mirror detection signal MIRR has logic value "0" when spot SP of light beam LB is located in the track portion on the signal recording surface of optical disk 10, and it has logic value of "1" when the light beam is located in the mirror portion.

Disk detecting unit 184 uses the following equation (20) to calculate digital disk detection signal DSKDET:

$$DSKDET = LPF(QD1btm + QD2btm) > \{BottomHoldM \\ (QD1btm + QD2btm) + Detect\ level\} \quad (20)$$

In the equivalent circuit, disk detecting unit 184 is comprised of adders 136, 138, bottom-hold circuit 170, low-pass filter 190, adder 192, and comparator 194 connected as shown. Adder 192 takes the sum of bottom-hold signal BottomHold M(QD1btm+QD2btm) from bottom-hold circuit 170 and the desired detection level Detect level, and outputs the sum signal. On the other hand, low-pass filter 190 attenuates or removes the low-frequency component from the sum signal (QD1btm+QD2btm) from adder 138, and outputs the low-frequency component. Comparator 194 compares output signal LPF(QD1btm+QD2btim) of low-pass filter 190 with output signal {BottomHold M(QD1btm+QD2btm)+Detect level} from adder 192, and corresponding to the relative magnitudes, outputs logic value 1 or 0 as disk detection signal DSKDET. As pickup 14 approaches to within a prescribed distance of disk 10, the disk detection signal DSKDET changes from logic value 0 to logic value 1.

As explained above, in digital operation unit 28 in this embodiment, one may simply perform digital calculation using the equation for generating the desired servo error signal, and there is no requirement for any special condition with respect to the configuration of the digital circuit. There is no need to specify the number and state of the input RF signals or the pin name. In addition, in this embodiment, from the input RF signal, the top envelope signal and bottom envelope signal are extracted, and digital operation treatment is carried out based on these envelope signals to form all necessary signals needed for servo control. Consequently, a circuit can be easily realized with higher general-purpose applicability to meet the demand of various pickup systems and specifications in a simple way.

Digital operation of the servo error detector not only has good general-purpose applicability, but it is also beneficial in making the device compact, less expensive and better in testability (checking ability). In this embodiment, when the aforementioned various servo error signals are generated, the same or shared calculations are carried out in plural rounds. Consequently, one may use a single operation circuit in time-division mode to calculate all of the servo error signals. For example, in the aforementioned example, when focus error signal FE, tracking error signal TE, center error signal CE and pull-in signal PI are generated at the same time, if the sampling frequency in analog/digital converting unit 26 is set at, say, 250 kHz, when said four types of operation are carried out during one period of the sampling clock, each operation requires only 1 μs, and an internal clock of 20 MHz or higher is enough. Also, by outputting the servo error signal obtained as a result of the digital operation in digital form as is, not only is there no degradation in the precision of the operation result, but also the A/D converter in the input stage of the servo signal processing unit of the next step is not needed.

In the embodiment shown in FIG. 13, the digital servo error signal output may also be converted from digital operation unit 28 into an analog signal with D/A converter 76, and to send the analog signal to a servo signal processing unit equipped with an A/D converter in the next stage. In this case, the IC (integrated circuit)carrying the servo error detector in this embodiment may be entirely replaced with a conventional analog operation IC.

In addition, in this implementation, operation treatment may be carried out by replacing the signal component needed for servo error detection contained in the RF signal output from pickup 14 with a low-frequency signal without a decrease in the level of the signal top envelope and/or bottom envelope state of the RF signal. Consequently, it is possible to generate a servo error signal with excellent SN characteristics and high precision. For example, when tracking error signal TE is generated, as shown in FIG. 11, it is possible to perform amplification during the operation treatment process for a waveform free of a RF signal component as is. Also, it is possible to perform amplification effectively by means of gain control amplifier 30 in the input stage.

Also, in this implementation, it is possible to cancel the offset of gain control amplifier 30 made of an operational amplifier during application of servo. That is, during holding of the sampling signal by sample hold circuits 36 of analog/digital operation unit 26, the amplification operation may be paused for corresponding gain control amplifier 30. During the pause time, one can turn on an offset canceling circuit (not shown in the figure) to cancel the offset in said gain control amplifier 30.

In the following, explanation will be provided on the difference between the system of this invention, in which the envelope is extracted beforehand from the RF signal, and the conventional system, in which the RF signal is simply fed through a low-pass filter, with respect to the frequency spectrum using Fourier transformation.

Figure 19A:
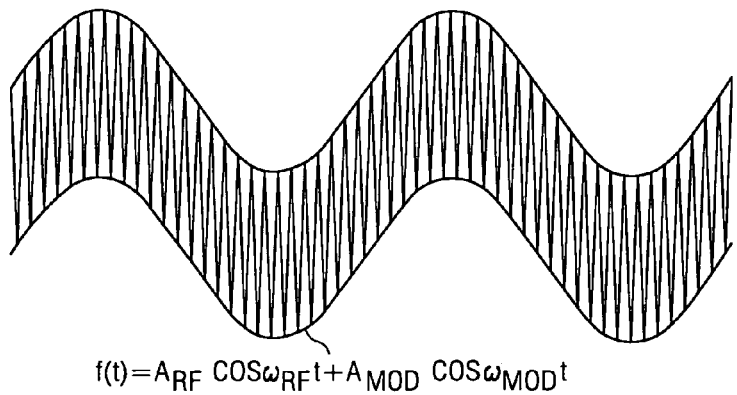
FIGS. 19A and 19B are diagrams illustrating the waveform and frequency spectrum of a model used for explaining a system of the present invention.

First of all, as shown in FIG. 19A, consideration will be made on a model in which a low-frequency modulation component MOD (t) (envelope component) is simply overlapped on RF signal RF(t) having a constant amplitude. Signal f(t) of this model is represented by the following equation (21):

$$f(t) = RF(t) + MOD(t) \quad (21)$$
$$= A_{RF}\cos\omega_{RF}t + A_{MOD}\cos\omega_{MOD}t$$

Here, $A_{RF}$ and $\omega_{RF}$ represent the amplitude and frequency of RF signal RF(t), and $A_{MOD}$ and $\omega_{MOD}$ represent the amplitude and frequency of low-frequency modulation component MOD (t), respectively. When Fourier transformation is carried out, said equation 21 becomes the following equation (22). The integration interval for each integration symbol f is $-\infty \sim +\infty$.

$$H(j\omega) = \int f(t)e^{-j\omega t}dt \quad (22)$$
$$= \int A_{RF}(e^{j\omega RFt} + e^{-j\omega RFt})/2 \cdot e^{-j\omega t}dt +$$
$$\int A_{MOD}(e^{j\omega MODt} + e^{-j\omega MODt})/2 \cdot e^{-j\omega t}dt$$
$$= A_{RF}/2 \cdot \int e^{-j(\omega-\omega RF)t}dt + A_{RF}/2 \cdot$$
$$\int e^{-j(\omega+\omega RF)t}dt + A_{MOD}/2 \cdot \int e^{-j(\omega-\omega MOD)t}dt +$$
$$A_{MOD}/2 \cdot \int e^{-j(\omega+\omega MOD)t}dt$$
$$= \pi A_{RF}\,\delta(\omega-\omega_{RF}) + \pi A_{RF}\,\delta(\omega+\omega_{RF}) +$$
$$\pi A_{MOD}\,\delta(\omega-\omega_{MOD}) + \pi A_{MOD}\,\delta(\omega+\omega_{MOD})$$

Figure 19B:
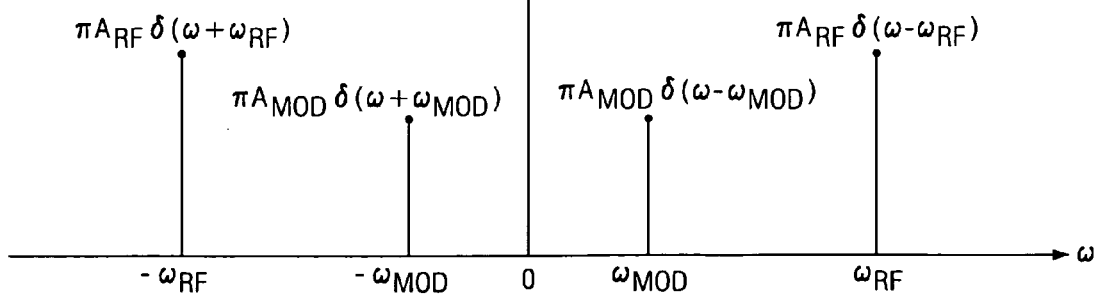

FIG. 19B shows the frequency spectrum of model signal f(t) obtained in said Fourier transformation.

Figure 20A:
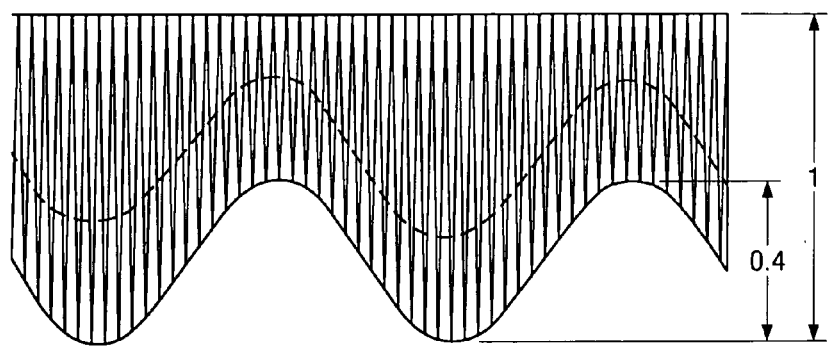
FIGS. 20A and 20B are diagrams illustrating the waveform and frequency spectrum of a model used for explaining a conventional system.

Next, as shown in FIG. 20A, consideration is given to a model in which a low-frequency modulation component MOD (t) is overlapped only on the bottom side of RF signal RF(t) having a constant amplitude. Signal f(t) of this model is represented by the following equation (23):

$$f(t) = RF(t) \times (1 - MOD(t)) + A_{RF}MOD(t) \quad (23)$$
$$= A_{RF}\cos\omega_{RF}t \times (1 - A_{MOD}\cos\omega_{MOD}t) +$$
$$A_{RF} \times A_{MOD}\cos\omega_{MOD}t$$

Here, $A_{RF}$ and $\omega_{RF}$ represent the amplitude and frequency of RF signal RF(t), and $A_{MOD}$ and $\omega_{MOD}$ represent the amplitude and frequency of low-frequency modulation component MOD (t), respectively. When Fourier transformation is carried out, equation (23) becomes the following equation (24). Also, the integration interval for each integration symbol f is $-\infty \sim +\infty$.

$$H(j\omega) = \int A_{RF}(e^{j\omega RFt} + e^{-j\omega RFt})/2 \cdot e^{-j\omega t}dt - \quad (24)$$
$$\int A_{RF}(e^{j\omega RFt} + e^{-j\omega RFt})/2 \cdot A_{MOD}(e^{j\omega MODt} +$$
$$e^{-j\omega MODt})/2 \cdot e^{-j\omega t}dt + \int A_{RF}A_{MOD}(e^{j\omega MODt} +$$

-continued $$e^{-j\omega MODt})/2 \cdot \int e^{-j\omega t} dt$$

$$= A_{RF}/2 \cdot \int e^{-j(\omega-\omega RF)t} dt + A_{RF}/2 \cdot \int e^{-j(\omega+\omega RF)t} dt -$$

$$A_{RF}/2 \cdot A_{MOD}/2 \cdot \int e^{-j(\omega-\omega RF-\omega MOD)t} dt +$$

$$\int e^{-j(\omega-\omega RF+\omega MOD)t} + A_{RF}A_{MOD}/2 \cdot \int e^{-j(\omega-\omega MOD)t} dt +$$

$$A_{RF}A_{MOD}/2 \cdot \int e^{-j(\omega+\omega MOD)t} dt$$

$$= \pi A_{RF} \delta(\omega - \omega_{RF}) + \pi A_{RF} \delta(\omega + \omega_{RF}) -$$

$$1/2 \cdot \{\pi A_{RF} A_{MOD} \delta(\omega - \omega_{RF} - \omega_{MOD}) +$$

$$\pi A_{RF} A_{MOD} \delta(\omega + \omega_{RF} + \omega_{MOD}) +$$

$$\pi A_{RF} A_{MOD} \delta(\omega + \omega_{RF} - \omega_{MOD}) +$$

$$\pi A_{RF} A_{MOD} \delta(\omega + \omega_{RF} + \omega_{MOD})\} +$$

$$\pi A_{RF} A_{MOD} \delta(\omega - \omega_{MOD}) + \pi A_{RF} A_{MOD} \delta(\omega + \omega_{MOD})$$

Figure 20B:
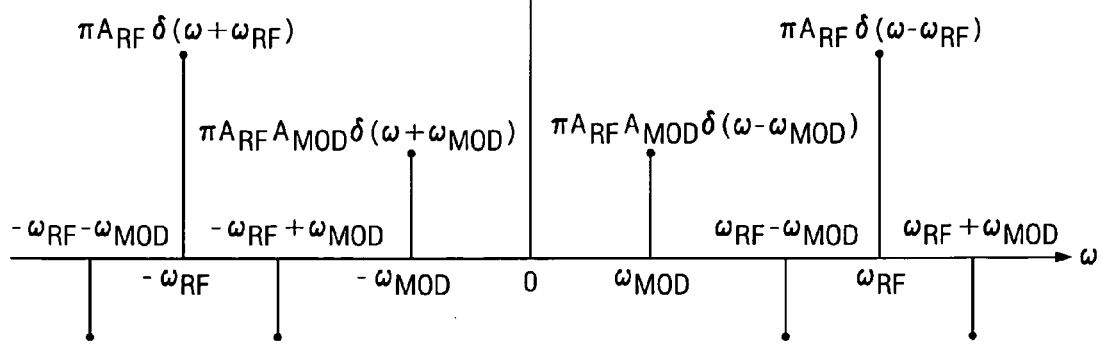

FIG. 20B shows the frequency spectrum of model signal f(t) obtained in said Fourier transformation.

When specific numerical data ($A_{RF}$=1/2, $A_{MOD}$=0.4/2) are substituted into the aforementioned equations to evaluate the various coefficients, the following result is obtained:

$$f(t) = RF(t) \times (1 - MOD(t)) + A_{RF} MOD(t) \quad (25)$$

$$= 1/2 \cdot \cos\omega_{RF}t \times (1 - 1/2 \cdot \cos\omega_{MOD}t) +$$

$$1/2 \cdot 0.4/2 \cdot \cos\omega_{MOD}t$$

$$= 0.5 \cos\omega_{RF}t(1 - 0.2 \cos\omega_{MOD}t) + 0.1 \cos\omega_{MOD}t$$

$$H(j\omega) = 0.5 \pi\delta(\omega - \omega_{RF}) + 0.5 \pi\delta(\omega + \omega_{RF}) -$$

$$\{0.05 \pi\delta(\omega - \omega_{RF} - \omega_{MOD}) +$$

$$0.05 \pi\delta(\omega + \omega_{RF} + \omega_{MOD}) +$$

$$0.05 \pi\delta(\omega + \omega_{RF} - \omega_{MOD}) +$$

$$0.05 \pi\delta(\omega + \omega_{RF} + \omega_{MOD})\} +$$

$$0.1 \pi\delta(\omega - \omega_{MOD}) + 0.1 \pi\delta(\omega + \omega_{MOD})$$

On the other hand, when Fourier transformation is performed for 0.4/2 cos ωt (the bottom envelope component shown in FIG. 20A) as is, the following result is realized:

$$H(j\omega)=0.2\pi\delta(\omega-\omega_{MOD})+0.2\pi\delta(\omega+\omega_{MOD}) \quad (26)$$

From equations (25) and (26), between the conventional system and the system of this invention, the relationship in the amplitude of the $\omega_{MOD}$ spectrum becomes 0.1:0.2, that is, 1:2.

This invention is not limited to the servo error signal generating circuit in the aforementioned embodiment. It may also be applied to various servo error signal generating circuits and various servo error detecting systems. Also, various modifications can be made for the element technologies used in this invention. In particular, for the light detecting means, envelope detecting means, analog/digital converting means, digital operation means, etc., they are not limited to the aforementioned embodiments. Various other systems or constitutions may also be adopted. For example, one may set plural A/D converters side-by-side in the analog/digital converting means.

In addition, when the servo processing circuit is composed of a programmable DSP (Digital Signal Processor) or the like, one may also perform the analog/digital conversion treatment by means of the programmable DSP, and it is possible to reduce the number of additional circuit devices. Also, in this invention, since the signal operation treatment is carried out in digital format, it is possible to handle various optical pickups without changing the program of the signal operation treatment, and there is no need to prepare a new circuit that fits the optical pickup.

As explained above, according to this invention, it is possible to improve the general-purpose applicability of the servo error detector, and it is possible to improve the precision and stability, to reduce the cost, and to increase the testability.

Those skilled in the art to which the invention relates will appreciate that yet other substitutions and modifications may be made to the described embodiments, without departing from the spirit and scope of the invention as set forth in the description and the claims.

The invention claimed is:

1. A type of servo error detector, comprising:
the servo error detector for an optical disk has one or several RF signals output from an optical pickup input to detect the position error or optical servo error of a light beam on the signal recording surface of the optical disk; the servo error detector for the optical disk has the following means:
an envelope detector that detects the top envelope and/or bottom envelope of each said RF signal and generates a top envelope signal and/or a bottom envelope signal that represents said top envelope and/or bottom envelope;
an analog/digital converter means that converts said analog top envelope signal and/or bottom envelope signal to a digital top envelope signal and/or bottom envelope signal;
and a servo error signal generator that performs a digital operation treatment for said digital top envelope signal and/or bottom envelope signal to generate one or several servo error signals,
wherein said analog/digital converter simultaneously samples plural analog top envelope signals and/or bottom envelope signals, and, using a time-division system, converts them to plural digital top envelope signals and/or bottom envelope signals.

2. The servo error detector described in claim 1, wherein said servo error detector includes a gain control amplifier that amplifies said RF signal at a prescribed gain before feeding it to said envelope detector.

* * * * *